United States Patent Office 2,776,292
Patented Jan. 1, 1957

2,776,292

SEPARATION OF MIXTURES OF COMPOUNDS BY MEANS OF METAL BENZENE SULFONATES

Richard M. Barrer, Aberdeen, Scotland, assignor to Union Carbide and Carbon Corporation, a corporation of New York No Drawing. Application January 19, 1953, Serial No. 332,075

6 Claims. (Cl. 260—290)

This invention relates to the separation of mixtures of chemical compounds into their components by certain metal benzene sulfonates, the components usually being quite difficult to isolate. Potassium benzene sulfonate will be used to illustrate the invention.

Potassium benzene sulfonate normally occurs as a hydrated crystalline material which may be rendered anhydrous by heating or by storing in vacuo over a drying agent or by creating a vacuum over the material at room temperature or by the passage of a dry gas stream through the crystals or by a combination of these methods, for instance by heating under vacuum. The dehydration causes a change in the crystalline structure of the sulfonate. Certain materials may then be sorbed on the dehydrated sulfonate while other materials will not be sorbed. The sulfonate has peculiar properties in that certain sorbates appear to cause a reversible rearrangement of the crystal structure which is associated with the sorption of still larger amounts of sorbate than would otherwise be possible. Apparently sorption takes place in several ways. Firstly, there is the adsorption of small amounts of adsorbate on the external surface of the crystal. Secondly, there is the passage into the anhydrous crystal of molecules of the sorbate to give crystal-sorbate complexes in which the original crystals have undergone various degrees of structural rearrangement as shown by X-ray powder photographs. The penetration and structural rearrangement requires that the molecules which penetrate should have the proper shape, size and other characteristics. Upon desorption, for instance under heat and vacuum, the crystal structures change back again until upon complete desorption the sulfonate has the crystal form which it originally had after dehydration.

Rubidium and cesium benzene sulfonates also exhibit these sorption characteristics but sodium, lithium, ammonium and calcium benzene sulfonates do not. The active metals are alkali metals in group 1 of the periodic table having atomic weights above 39.

With most sorbates a certain "threshold" pressure is observed, at or above which the sorption becomes much enhanced and which is associated with the commencement of very marked structural changes in the crystals; but it is found that with several sorbates, for instance thiophene, pyridine, p-dioxane, ethylamine and ammonia a "threshold" pressure is apparently not required and appreciable sorption occurs at low pressures so that it is possible to separate these materials from other materials, for instance, benzene, cyclohexane and the like.

Thus with the proper dehydrated or anhydrous metal benzene sulfonate will sorb ammonia, ethylamine, p-dioxane, pyridine, and thiophene molecules in preference to cyclohexane and benzene molecules. The first group of compounds are polar and heterocyclic and the second group are non-polar and hydrocarbons. In forming the sorption complex it appears that the polar and heterocyclic molecules are more strongly sorbed than are non-polar and hydrocarbon molecules, provided the shape and size factors are satisfactory. For polar sorbate molecules the limiting molecular thickness below which substantial recrystallization of the sorbent may be induced can rise as high as 5.1 A. or slightly higher but cannot rise above about 7.0 A. For non-polar molecules, the upper limit for penetration and substantial recrystallization is a thickness of 4 A. and molecules of greater thickness give swelling only, if they penetrate the sorbent crystal at all. In the separation of mixtures of polar, heterocyclic, hydrocarbon and non-polar compounds, the polar and heterocyclic compounds are sorbed in preference to non-polar and hydrocarbon compounds even though in tests on unmixed gases non-polar and hydrocarbon compounds may be sorbed.

The action of potassium benzene sulfonate as representative of cesium, rubidium and potassium benzene sulfonates is illustrated in the following examples.

Example 1

The apparatus used in this and succeeding examples was a tube containing about 50 grams of powdered potassium benzene sulfonate, 100 mesh sieve size. The tube was provided with stop cocks at the top and bottom. Connected to the upper stop cock, was a measuring flask or graduate so that a measured amount of liquid would run from the graduate into the tube upon opening the stop cock. The lower cock was connected to a removable trap which could be connected to a source of vacuum or closed off from the vacuum by a stop cock. A removable vessel for holding refrigerant surrounded the trap. A coiled wire around the tube allowed the tube to be heated by electricity to such temperatures as were desired.

With this apparatus the sulfonate was outgassed at 160° C. for 24 hours by closing the top cock and opening the cock into the trap and the cock from the trap to the source of vacuum. All cocks were then closed and the tube allowed to cool to 30° C. A 1:1 mixture by volume of pyridine and cyclohexane was then poured into the graduate at the top of the column and the top cock was opened to allow 10 cc. of the mixture to enter the tube, sufficient of the mixture being used in the graduate so that no air entered the tube. The column was permitted to remain in this condition overnight (approximately 12 hours). After this period liquid air, as refrigerant, was applied around the trap and the bottom cock of the tube was opened, whereupon a liquid began to condense in the trap. When 5 cc. of liquid had been collected in the trap the cock at the bottom of the tube was closed. Analysis of this liquid by means of its refractive index showed it to be pure cyclohexane.

Another trap was substituted for the first and evacuated, whereupon the tube was heated to 70° C. and the bottom cock from the tube into the trap was opened. Five cc. of liquid which refractive index analysis showed to be pure pyridine collected in the refrigerated trap.

The outgassing was at 160° C. for 24 hours for convenience; substantially any other temperature or time can be used, the object being to dehydrate the sulfonate quite thoroughly and remove any volatile materials. Substantially any temperature other than the 30° C. can be used, for instance temperatures from 6° C. to 50° C., 30° C. being used merely because it was convenient to maintain. Any suitable refrigerant may be used providing it maintains the trap at a sufficiently low temperature to liquefy vapors of the materials in the tube.

Example 2

The procedure of Example 1 was followed except that 2 cc. of a 1:1 mixture of p-dioxane and benzene were used instead of the mixture of pyridine and cyclohexane.

After the p-dioxane and benzene had remained in contact with the sulfonate for 48 hours, 1 cc. of liquid, which refractive index measurments showed to be 99% benzene, was collected by cooling the trap to −29° C. for three minutes. Heating the column at 70° C. for 36 hours with liquid air around the trap gave 1 cc. of a liquid which refractive index measurements showed to be substantially pure p-dioxane.

*Example 3*

The procedure of Example 1 was followed except that 2 cc. of a 1:1 mixture of thiophene and benzene were used instead of the pyridine-cyclohexane mixture. After standing overnight 1 cc. of a liquid, which analysis by refractive index showed to be 99% benzene, was removed from the trap, cooled with liquid air. On leaving the liquid air around another trap for a further period of four hours, 1 cc. of a liquid, which refractive index analysis showed to be substantially pure thiophene, was recovered. Repeating the procedure using the benzene fraction first produced gave pure benzene and repeating the procedure using the thiophene fraction first produced gave pure thiophene.

What is claimed is:

1. Method of separating a member of the group consisting of thiophene, pyridine, p-dioxane, ethylamine and ammonia from a mixture thereof with a hydrocarbon selected from the class consisting of benzene and cyclohexane which comprises contacting the mixture with a dehydrated metal benzene sulfonate where the metal is an alkali metal of group 1 of the periodic table having an atomic weight of at least 39.

2. Method of separating pyridine from a mixture thereof with a non-polar compound selected from the group consisting of benzene and cyclohexane which comprises contacting the mixture with a dehydrated metal benzene sulfonate where the metal is an alkali metal of group 1 of the periodic table having an atomic weight of at least 39.

3. Method of separating p-dioxane from a mixture thereof with a non-polar compound selected from the group consisting of benzene and cyclohexane which comprises contacting the mixture with a dehydrated metal benzene sulfonate where the metal is an alkali metal of group 1 of the periodic table having an atomic weight of at least 39.

4. Method of separating thiophene from a mixture thereof with a non-polar compound selected from the group consisting of benzene and cyclohexane which comprises contacting the mixture with a dehydrated metal benzene sulfonate where the metal is an alkali metal of group 1 of the periodic table having an atomic weight of at least 39.

5. Method of separating ethylamine from a mixture thereof with a non-polar compound selected from the group consisting of benzene and cyclohexane which comprises contacting the mixture with a dehydrated metal benzene sulfonate where the metal is an alkali metal of group 1 of the periodic table having an atomic weight of at least 39.

6. Method of separating ammonia from a mixture thereof with a non-polar compound selected from the group consisting of benzene and cyclohexane which comprises contacting the mixture with a dehydrated metal benzene sulfonate where the metal is an alkali metal of group 1 of the periodic table having an atomic weight of at least 39.

References Cited in the file of this patent

UNITED STATES PATENTS

| | | |
|---|---|---|
| 2,025,715 | Bird | Dec. 31, 1935 |
| 2,436,494 | Shipley et al. | Feb. 24, 1948 |
| 2,438,001 | Dockendorff | Mar. 16, 1948 |
| 2,446,679 | Wadsworth et al. | Aug. 10, 1948 |
| 2,564,717 | Olsen | Aug. 21, 1951 |

OTHER REFERENCES

Lange et al.: Chem. Abst., vol. 28, p. 1587 (1934).
Lange: Chem. Abst., vol. 28, p. 7103 (1934).